United States Patent
Thevenon et al.

(10) Patent No.: US 8,699,949 B2
(45) Date of Patent: Apr. 15, 2014

(54) METHOD FOR DETECTION OF A CONTACTLESS RECEIVER

(75) Inventors: Pierre-Henri Thevenon, Bas-en-Basset (FR); Olivier Savry, Sassenage (FR)

(73) Assignee: Commissariat a l'Energie Atomique et aux engergies alternatives, Paris (FR)

( * ) Notice: Subject to any disclaimer, the term of this patent is extended or adjusted under 35 U.S.C. 154(b) by 207 days.

(21) Appl. No.: 13/446,296

(22) Filed: Apr. 13, 2012

(65) Prior Publication Data

US 2012/0264373 A1    Oct. 18, 2012

(30) Foreign Application Priority Data

Apr. 14, 2011  (FR) ...................................... 11 53262

(51) Int. Cl.
*H04B 5/00* (2006.01)
(52) U.S. Cl.
USPC .................. 455/41.1; 340/572.4; 340/10.1
(58) Field of Classification Search
USPC .............. 455/41.1, 41.2, 44, 45, 67.11, 106; 340/572.1, 572.2, 572.4, 572.5, 10.1, 340/10.3
See application file for complete search history.

(56) References Cited

U.S. PATENT DOCUMENTS

| | | | |
|---|---|---|---|
| 7,598,872 B2 * | 10/2009 | Pl ss et al. ................... | 340/572.4 |
| 2008/0218314 A1 * | 9/2008 | Van Eeden .................... | 340/10.1 |
| 2011/0053500 A1 * | 3/2011 | Menegoli et al. ............ | 455/41.1 |
| 2013/0288599 A1 * | 10/2013 | Bernard et al. .............. | 455/41.1 |

FOREIGN PATENT DOCUMENTS

| | | |
|---|---|---|
| EP | 0944014 | 9/1999 |
| EP | 2 148 289 | 1/2010 |
| WO | WO 2009/154987 | 12/2009 |

\* cited by examiner

*Primary Examiner* — Thanh Le
(74) *Attorney, Agent, or Firm* — Occhiuti & Rohlicek LLP (57) ABSTRACT

A method for detecting a contactless receiver in a field of an antenna of a contactless reader includes during a first ramp interval, exciting the antenna by applying a potential difference comprising a ramp between first and second values of the potential difference, and during a first plateau interval following the first ramp interval, maintaining the potential difference at the second value of the potential difference, while maintaining the potential difference at the plateau, measuring a response of the antenna, comparing the measured response and a reference response, and determining presence of a contactless receiver in the field of the antenna based at least in part on a result of the comparison.

21 Claims, 5 Drawing Sheets

METHOD FOR DETECTION OF A CONTACTLESS RECEIVER

RELATED APPLICATIONS

Under 35 USC 119, this application claims the benefit of the priority date of French Patent Application 1153262, filed Apr. 14, 2011, the contents of which are herein incorporated by reference.

The invention relates to wireless communications by inductive coupling, typically implemented in RFID systems or for contactless communications.

An increasing number of applications make use of contactless transmissions. Communication systems of the inductive RFID type have notably been developed and are rapidly becoming more widespread. Such a system comprises a base station or reader, and an autonomous object comprising an identification number and operating as a remotely-powered receiver. The receiver is generally referred to as a label when it is attached to a product, or referred to as a contactless card when it is designed for personal identification.

In such systems, a link is established by radiofrequency magnetic field between the reader and one or more receivers. This magnetic field is quasi-stationary. The coupling devices of the reader and of the receiver are conducting circuits including loops, windings or coils forming an antenna circuit. Electronic components are associated with the antenna circuit having the function of carrying out a frequency tuning, a damping or an impedance matching.

Figure 1:
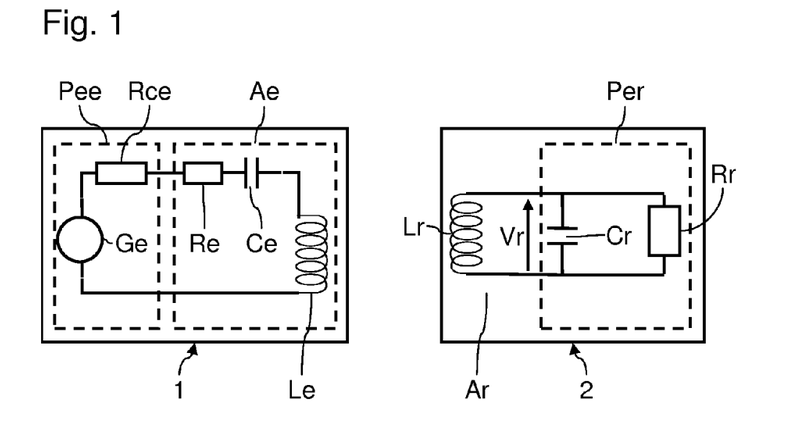
FIG. 1 is an equivalent electrical diagram of a system including a reader and an RFID receiver of the inductive type.

FIG. 1 provides a schematic example of the conventional electrical diagram of a reader 1 and of a contactless RFID receiver 2 with inductive coupling.

On the reader side, the antenna circuit Ae can be modelled by an equivalent inductance Le, in series with a resistance Re and a capacitance Ce. The antenna circuit Ae is connected to an electronic circuit Pee of the reader. The output impedance of the reader can be modelled by a resistance Rce, connected in series with the antenna circuit Ae and a power supply Ge.

On the receiver side, the antenna circuit Ar can be modelled by an equivalent inductance Lr. The antenna circuit Ar is connected to an electronic circuit Per. The electronic circuit contains a capacitor Cr. The electrical power consumption of this electronic circuit can be modelled by a resistance Rr connected in parallel with the equivalent inductance Lr.

The inductive coupling induces the transfer of energy between the reader and the receiver by mutual inductance. When the receiver is placed close enough to the reader, the antenna of the reader is coupled to the antenna of the receiver. An alternating voltage or electromotive force is thus induced in the receiver. This voltage is rectified and generally used to power the functions of the receiver.

In order to allow the transmission of data from the receiver to the reader, the receiver modifies the impedance that it presents to the terminals of the antenna circuit. This variation in impedance is detected by the reader owing to the inductive coupling. The design specifications for RFID systems of the inductive type are notably defined in the standards ISO 15693, ISO 18000-3 and ISO 14443. These standards notably fix the frequency of the carrier of the signal at 13.56 MHz. The ISO 18000-2 standard fixes the carrier of the signal to a level below 135 KHz. In practice, the distance for communication between the reader and the receiver is relatively limited, typically in the range between around ten cm and one metre for these frequencies.

Two separate phases of operation may be considered for the reader:

a communication phase when a receiver is identified in the field of the reader;

a standby phase when no receiver has yet been identified in the field of the reader.

Before any communication phase between the reader and a receiver, the reader must identify this receiver within its field of communication. During the standby phase, the reader periodically tries to identify the presence of one or more receivers in its field of communication. At regular intervals, the radiofrequency field of the reader is activated by exciting the antenna with a sinusoidal voltage at its resonant frequency for a predetermined period of time. During the activation time, the reader emits several requests in a recursive manner according to a standardized protocol. Following these requests, the reader maintains its field activated for detecting a possible response of a receiver. In order to accelerate the detection of the receivers, the field is activated with a relatively large duty cycle during a standby phase, for example 0.25.

The document EP0944014 describes a method for detection of an RFID transponder in the field of an RFID reader. According to this method, the RFID reader applies a voltage pulse to the terminals of its antenna with a duration of 2 μs. Following this pulse, the response in intensity from the antenna is measured and filtered. Depending on the speed of decay of this response, the reader determines the presence or otherwise of a transponder in its field. In the example provided in this document, in the absence of an RFID transponder, the response in intensity exhibits a decay time of around 800 μs corresponding to a hundred or so excitation cycles.

In the various fields of electronics, with a greater tendency to take into account environmental issues and issues of autonomy, the developers have been driven to give a greater attention to the reduction of the electrical power consumption. Consequently, it is desirable to reduce the electrical power consumption of the reader as much as possible, in particular during the standby phases, in the absence of any identified receiver. The power consumption during the standby phases can prove to be non-negligible, and the standby phases can furthermore constitute the major part of the operating time of the reader.

The invention aims to solve one or more of these drawbacks. The invention thus relates to a method for detection of a contactless receiver in the field of the antenna of a contactless reader, comprising the steps for:

excitation of the antenna of the reader by a potential difference comprising:

a ramp between first and second values of potential differences;

following the ramp, a plateau at the second value of potential difference;

measurement of the response of the antenna during the said plateau;

comparison between the measured response and a reference response;

determination of the presence of a receiver in the field of the antenna of the contactless reader depending on the result of the comparison.

According to one variant, the antenna of the reader can be modelled by a resonator having a resistance, a capacitance and an inductance in series, with T the natural period of the resonator, in which the ramp has a duration less than T/3.

According to a further variant, the plateau has a duration greater than 8*T, the duration of the plateau being preferably equal to at least 50% of the duration of the measurement of the response of the antenna.

According to another variant, the plateau has a duration greater than 50*T.

According to another variant, the resonant frequency of the resonator is in the range between 10 and 20 MHz.

According to yet another variant, the method furthermore comprises the steps for:
- preferably during the said plateau, interruption of the said measurement of the response of the antenna;
- following the said plateau, excitation of the antenna of the reader by another potential difference comprising:
- another ramp between the second and first values of potential differences;
- following the other ramp, another plateau at the first value of potential difference;
- measurement of the response of the antenna during the said other plateau;
- comparison between the measured response during the said other plateau and a reference response;
- determination of the presence of a receiver in the field of the contactless reader depending on the result of the latter comparison.

According to one variant, the reader and the receiver implemented are of the type with an inductive coupling antenna.

According to yet another variant, the method comprises steps for:
- comparison of the measured response with reference responses corresponding to various distances between the antenna of the reader and a receiver;
- determination of the distance between the antenna of the reader and a receiver depending on the comparison between the measured response with the reference responses.

When the type of receiver identified is a relay, the method furthermore comprises a step for blocking a transaction between the reader and the identified relay.

According to another variant, the method comprises steps for:
- comparison of the measured response with reference responses corresponding to various types of receivers present in the field of the antenna of the reader;
- identification of the type of receiver present in the field of the antenna of the reader depending on this latter comparison.

According to yet another variant, the comparison is chosen from within the group comprising:
- the calculation of the correlation between the reference response and the measured response;
- the comparison of an amplitude of the measured response with an amplitude of the reference response;
- the comparison of the envelope of the measured response with the envelope of the reference response;
- the comparison of the measured spectral response with the reference spectral response;
- the comparison of statistical elements of the measured response with statistical elements of the reference response.

The invention also relates to a contactless reader, comprising:
- an antenna;
- a circuit configured for selectively exciting the antenna with a frequency substantially equal to the resonant frequency of this antenna during a phase of communication with a receiver.

The said circuit is furthermore configured for:
- selectively exciting the antenna with a potential difference comprising:
  - a ramp between first and second values of potential differences;
  - following the ramp, a plateau at the second value of potential difference;
  - measuring the response of the antenna during the said plateau;
  - comparing the measured response with a reference response;
  - determining the presence of a receiver in the field of the antenna depending on the result of the comparison.

According to one variant, the antenna of the reader can be modelled by a resonator with a resistance, a capacitance and an inductance in series, with T the natural period of the resonator, the said circuit being configured for applying the said ramp with a duration less than 0.1*T.

According to another variant, the said circuit is configured for applying the said plateau with a duration greater than 8*T.

According to a further variant, the reader is of the type with an inductive coupling antenna.

Other features and advantages of the invention will become clearly apparent from the description which is presented hereinafter, by way of non-limiting example, with reference to the appended drawings, in which.

The invention provides a method for detection of a contactless receiver in the field of the antenna of the reader. For this purpose, the antenna of the reader is excited by a potential difference comprising a ramp between first and second values of potential differences, and a plateau at the second value of potential difference. The response of the antenna is measured during the plateau and compared with a reference response. The presence of a receiver in the field of the antenna is determined depending on the result of the comparison. A plateau means maintaining a same value of potential difference.

The invention allows the electrical power consumption of the reader to be substantially reduced during the standby phases without altering the capability for recognition of the receivers. The invention notably allows the presence of a receiver to be detected without requiring an excitation of the antenna at its resonant frequency, which leads to a significant reduction in the electrical power consumption.

During the standby phase of the reader, detection steps are carried out at regular intervals for as long as no receiver has been detected in the field of the antenna. The step for detection of a receiver during a standby phase of the reader includes three sub-steps:

the excitation of the antenna by a potential difference combining a ramp and a plateau;
the measurement of the response of the antenna;
the comparison of the measured response with a reference response and the determination of the presence of the receiver.

Figure 2:
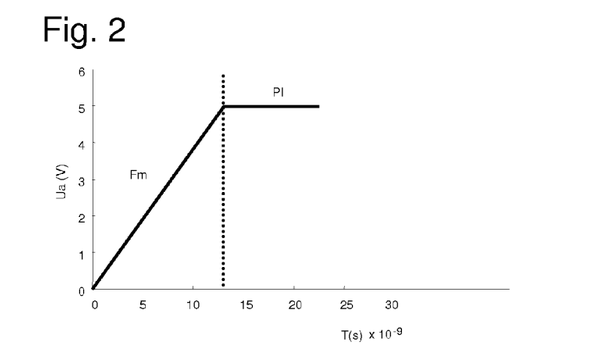
FIG. 2 is a diagram illustrating the excitation of the antenna of a transmitter during a phase for detection of receivers.

FIG. 2 is a diagram showing one example of excitation applied to the antenna of a reader according to the invention in a detection step during a standby phase. The applied excitation is initiated starting from a first value of DC potential difference applied to the terminals of the antenna; in this case, this first value is zero. A voltage ramp is applied to the terminals of the antenna during a first period Fm. A plateau at a second value of potential difference is then applied to the terminals of the antenna during a second period Pl. This second value of potential difference is, in this case, a high value (for example 5V) reached at the end of the voltage ramp.

In practice, the ramp allows the resonant circuit formed by the antenna to be charged and the antenna of the reader to be excited over a wide range of frequencies. It is thus easy to include the resonant frequency of the receiver within this wide frequency range, which facilitates the generation of a field in return.

The plateau allows interference of the response in intensity of the antenna of the reader to be avoided. Consequently, the plateau advantageously extends over the major part of the duration of measurement of the response of the antenna of the reader (hence over at least 50% of the duration of measurement of the response of the antenna of the reader), or even over the entirety of the duration of measurement of the response of the antenna of the reader (the measurement is then carried out solely during the plateau). Advantageously, the plateau has a duration equal to at least 8 resonance periods of the antenna of the reader, such that the response can be measured without interference in the period where its amplitude is greatest.

The plateau furthermore allows the electrical power consumption of the antenna to be limited outside of the measurement period. Indeed, the current flowing through the antenna of the reader quickly falls to zero, which results in a zero electrical power consumption of the antenna. Advantageously, the plateau has a duration equal to at least 50 resonance periods of the antenna of the reader.

Such an excitation exhibits an electrical power consumption much more reduced than an excitation at the resonant frequency of the antenna circuit. The electrical power consumption of the reader during the standby phase is thus greatly reduced.

Figure 3:
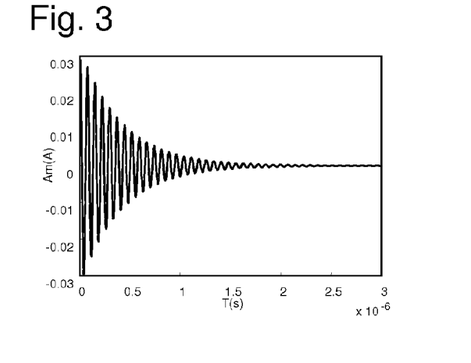
FIG. 3 illustrates the step response of the antenna of the reader in the absence of a receiver in the field of the reader.
Figure 4:
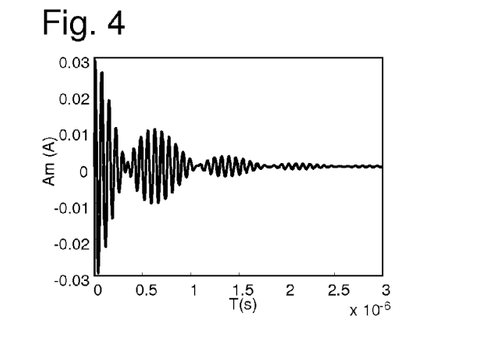
FIG. 4 illustrates the step response of the antenna of the reader in the presence of a receiver in the field of the reader.

FIG. 3 illustrates the response in intensity of the antenna to the excitation signal in FIG. 2, in the absence of a receiver in the field of the antenna. FIG. 4 illustrates one example of response in intensity of the antenna to the excitation signal in FIG. 2, in the presence of a receiver in the field of the antenna. In view of the slope of the applied voltage ramp, these responses could be considered as step responses.

Figure 5:
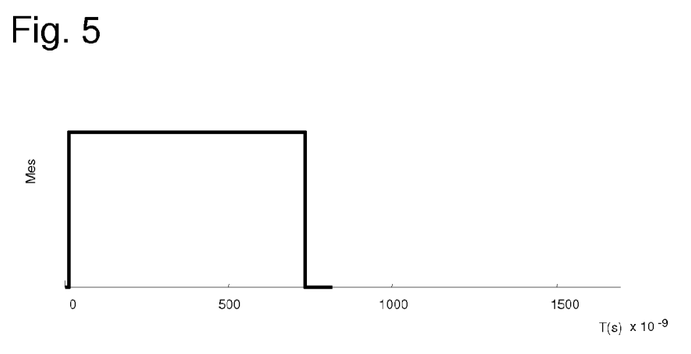
FIG. 5 illustrates an activation signal for a measurement of a response of the antenna.

The responses are advantageously measured during the plateau of the excitation but can also be measured in part during the ramp. The measurement of the response is thus not subject to interference by the excitation at the terminals of the antenna. FIG. 5 illustrates the activation signal for the sampling of the response of the antenna. The sampling is carried out over a period corresponding to about ten oscillations, i.e. 737 ns.

As illustrated in FIG. 3, in the absence of a receiver in the field of the antenna, the current flowing through the antenna forms damped oscillations. These oscillations undergo an exponential decay modulated at the resonant frequency of the series RLC circuit modelling the antenna and the circuit.

As illustrated in FIG. 4, in the presence of a receiver in the field of the antenna, the current flowing through the antenna exhibits modulated oscillations at the resonant frequency of the series RLC circuit modelling the antenna circuit of the reader. These oscillations simultaneously undergo damping and beating.

These differences in response may be explained in theory by an alteration of the transfer function of the antenna of the reader in the presence of the receiver in its field. Owing to the fact that the resonant frequency of the antenna of the receiver differs to a certain extent from that of the antenna of the reader, the return field generated by the antenna of the receiver interferes with the antenna of the reader. The mismatch of the antenna of the emitter in the case of coupling and the distance between the antennas also has an influence on the response. In addition, the coupling between the antenna of the reader and the antenna of the receiver causes a shift of the resonant frequency of the antenna of the reader.

The response in the presence of several receivers could differ from that in FIG. 4. However, such a presence will readily be identifiable from the existence of a large difference with respect to the response illustrated in FIG. 3.

Figure 6:
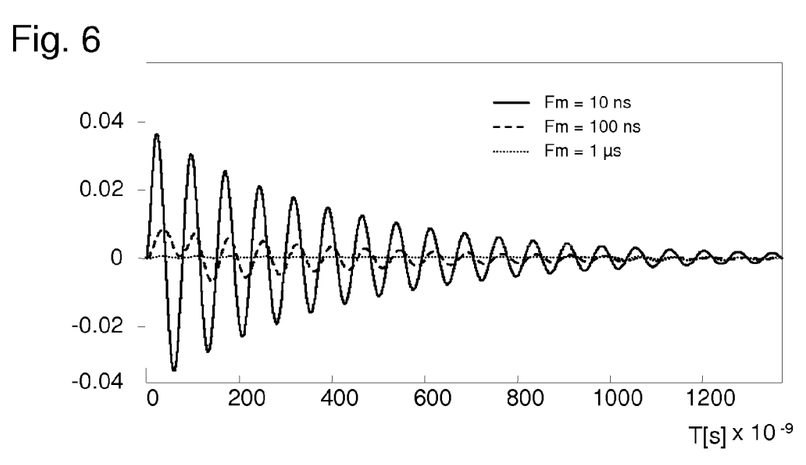
FIG. 6 is a diagram illustrating the effect of the rise time of the ramp on the amplitude of the response.

FIG. 6 is a diagram illustrating the response of the antenna of the reader as a function of various rise times of the ramp Fm. The responses of the antenna have been simulated with a second value of potential difference equal to 5 V, and with an infinite duration of plateau, in the absence of a receiver in the field of the antenna of the reader.

It has been observed that the response for a rise time of 1 ns is equivalent to the response for a rise time of 10 ns. The amplitude of the response is highly attenuated for a rise time of 100 ns and virtually zero for a rise time of 1 μs.

In practice, for a resonance period T of the antenna, the rising edge advantageously has a duration less than T/3, and preferably a duration less than T/4 (which corresponds to the duration of a rising edge of an oscillation). Such a duration of the rise time allows a satisfactory amplitude of the response of the antenna to be guaranteed, so as to be able to carry out satisfactory measurements and analyses, without the ramp interfering with the oscillations of the response.

Others simulations carried out with a second, markedly higher, value of potential difference have demonstrated that the rise time of the ramp Fm is predominant over the amplitude of the response with respect to the slope of this ramp.

Further simulations have demonstrated that a duration of the plateau at least equal to T/4 allowed a satisfactory amplitude of the response of the antenna to be guaranteed while limiting the distortions.

Figure 7:
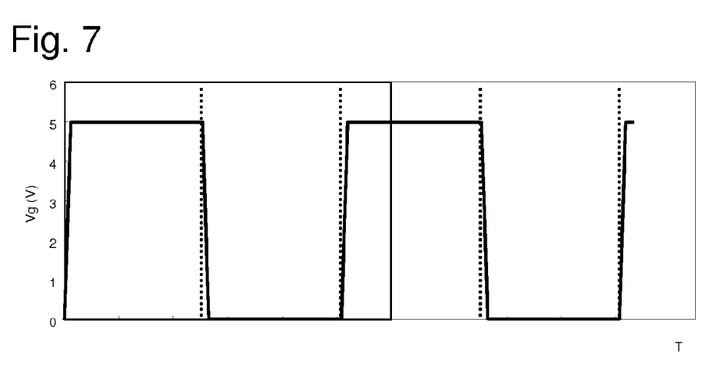
FIG. 7 is a diagram illustrating a standby phase comprising several successive detection steps.

In order to optimize the electrical power consumption during successive detection steps, the potential difference plateau is advantageously maintained until the following detection step. As illustrated in FIG. 7 (with the voltage applied by the generator to the antenna as the ordinate), during the following detection step, the excitation comprises a ramp between the second value of potential difference and the first value of potential difference. A falling edge from the preceding plateau is thus used in order to obtain a response from the antenna. The preceding measurement of the response of the antenna is thus interrupted before this ramp for the following detection step. The starting point for each new detection step is illustrated by a vertical dotted line in FIG. 7.

In order to proceed with the detection of a receiver in the field of the antenna of the reader, various comparisons can be performed between the measured response of the antenna and the reference response. The comparison can notably consist in calculating the correlation between the reference response and the measured response, in comparing an amplitude of the measured response with a reference amplitude, in comparing the envelope of the measured response with the envelope of the reference response, in comparing the measured spectral response with a reference spectral response (for example by an analysis of the FFT type), or in comparing statistical elements (such as the variance, the mean, etc.) of the measured response with respect to statistical elements of the reference response.

If a close similarity between the reference response and the measured response is determined during the comparison, the reader deduces from this the absence of a receiver in its field. The standby phase continues by repeating detection steps.

In the opposite case, a dissimilarity between the reference response and the measured response is identified, and the reader deduces from this the presence of a receiver in the field of its antenna. The reader then activates the radiofrequency field of the antenna by exciting the latter at its resonant frequency and by transmitting a request to the receiver according to a protocol defined in communications standards.

In the case of a false negative, if a receiver present in the field of the antenna of the reader is not detected, this receiver will be detected during a later detection step. The period between two successive detection steps will be defined according to the requirements of the application and could for example be in the range between 10 µs and 10 ms.

In the case of a false positive, if the reader wrongly determines the presence of a receiver in the field of its antenna, the reader will not obtain any response to its request after having activated its radiofrequency field. The reader will thus go back into standby phase and will repeat detection steps.

A reference response for the antenna is determined during the setting up of the reader or in a calibration step during the manufacturing. This response is measured during the application of the ramps and of the plateaus of potential differences intended to be applied during the standby phases, this response being measured in the absence of a receiver in the field of the reader.

The response of the antenna can be the object of a frequency or time-domain characterization.

Figure 8:
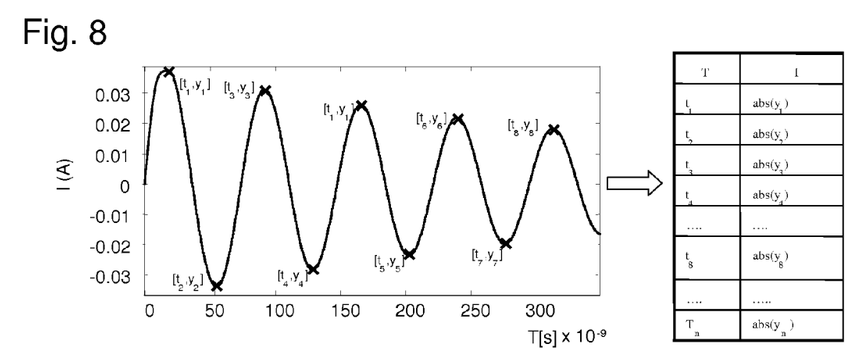
FIG. 8 illustrates a sampling phase with a view to carrying out the calibration of the response of the antenna.

According to one example of calibration, the time response of the antenna can be digitized by a sampling method such as illustrated in FIG. 8. The sampling can consist in memorizing only the extremities of the damped sinusoid of the time response, which amounts to memorizing the shape of the envelope of the response. The extremities can be sampled synchronously, the response forming the sampling clock. For each sample, a time value and an amplitude value corresponding to one extremity are obtained. The sampled values can be stored in a table in order to be compared with the values sampled during a detection step when the reader is in operation.

Figure 9:
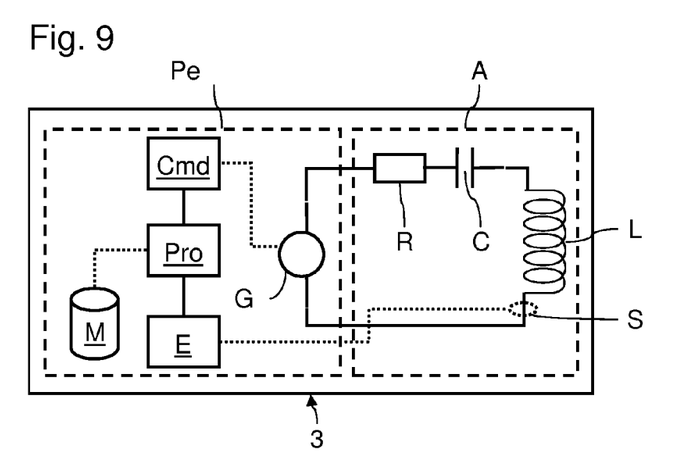
FIG. 9 is a schematic diagram of one example of a reader capable of implementing the invention.

FIG. 9 is a schematic diagram of one example of a reader 3 configured to implement the invention. The reader 3 comprises an antenna circuit A modelled by an equivalent inductance L, in series with a resistance R and a capacitance C. This antenna circuit A is thus modelled by a resonant series RLC circuit. This series RLC circuit can typically exhibit a resonant frequency of around 13.56 MHz for a reader according to the standard ISO 14443. The reader 3 comprises a current measurement probe S (for example a coil for measurement of current passing through the antenna circuit). The antenna circuit A is connected to an electronic circuit Pe of the reader 3. The electronic circuit Pe includes a power supply G, a sampling circuit E, a memory M, a processing circuit Pro and a control circuit Cmd. The current measurement probe S is connected to the sampling circuit E. The processing circuit Pro communicates with the sampling circuit E, the control circuit Cmd and the memory M. The control circuit Cmd controls the excitation of the power supply G.

The control circuit Cmd sends a command to the generator G to apply the excitation including the ramp and the plateau to the antenna A. The sampling circuit E samples the response to this excitation. The memory M stores a reference response of the antenna A. The processing circuit Pro compares the sampled response with the reference response stored in the memory M. The processing circuit Pro determines the presence of a receiver depending on the result of this comparison. If the processing circuit Pro determines the presence of a receiver in the field of the antenna A, a corresponding signal is transmitted to the control circuit Cmd. The control circuit Cmd then sends a command to the power supply G for the application of a voltage at the resonant frequency of the antenna A for the transmission of a request to the receiver.

Figure 10:
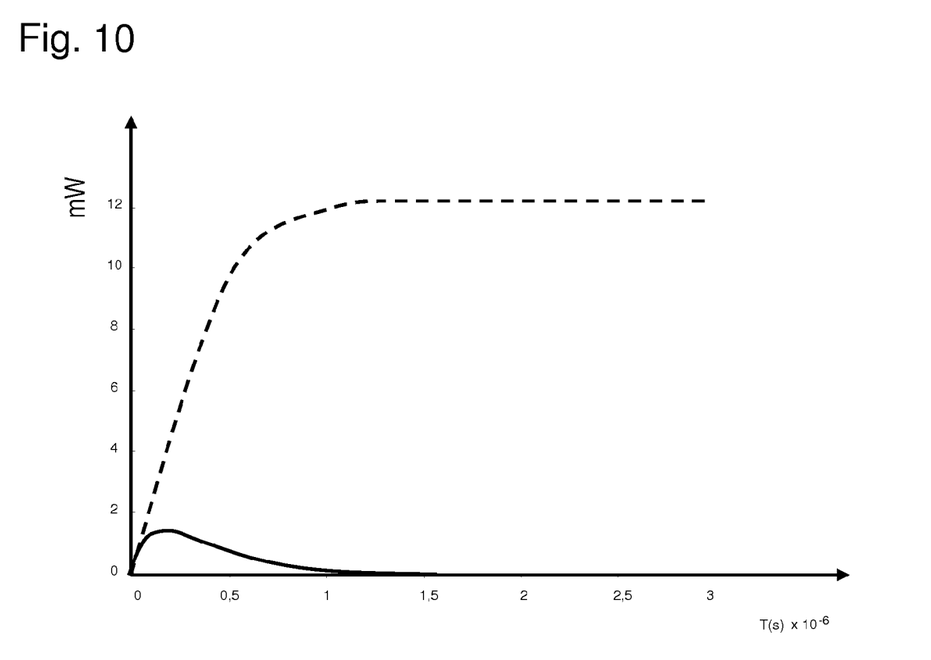
FIG. 10 is a comparative diagram of envelopes of the instantaneous powers of readers during a detection step.

FIG. 10 illustrates the envelope of the instantaneous powers consumed by the respective generators of a reader according to one embodiment of the invention and a comparable reader according to the prior art. The simulations have been carried out with antenna circuits modelled by a resistance R of 7.3Ω, a capacitance C of 90 pF, an inductance of 1.5 µH and a difference of 10 V between the first and second values of potential differences applied by the generator.

The solid-line curve corresponds to the reader according to the embodiment of the invention, the dashed-line curve corresponding to the reader according to the prior art.

It can be observed, on the one hand, that the maximum amplitude of the power consumed by the reader according to the invention is around 10 times less than that of the reader according to the prior art. Furthermore, the power consumed by the reader according to the invention decreases and becomes substantially zero after 1.5 µs. On the contrary, the power consumed by the reader according to the prior art increases up to a maximum amplitude after 1.5 µs, then remains at this level during the whole of the remainder of the radiofrequency excitation of the detection step.

Figure 11:
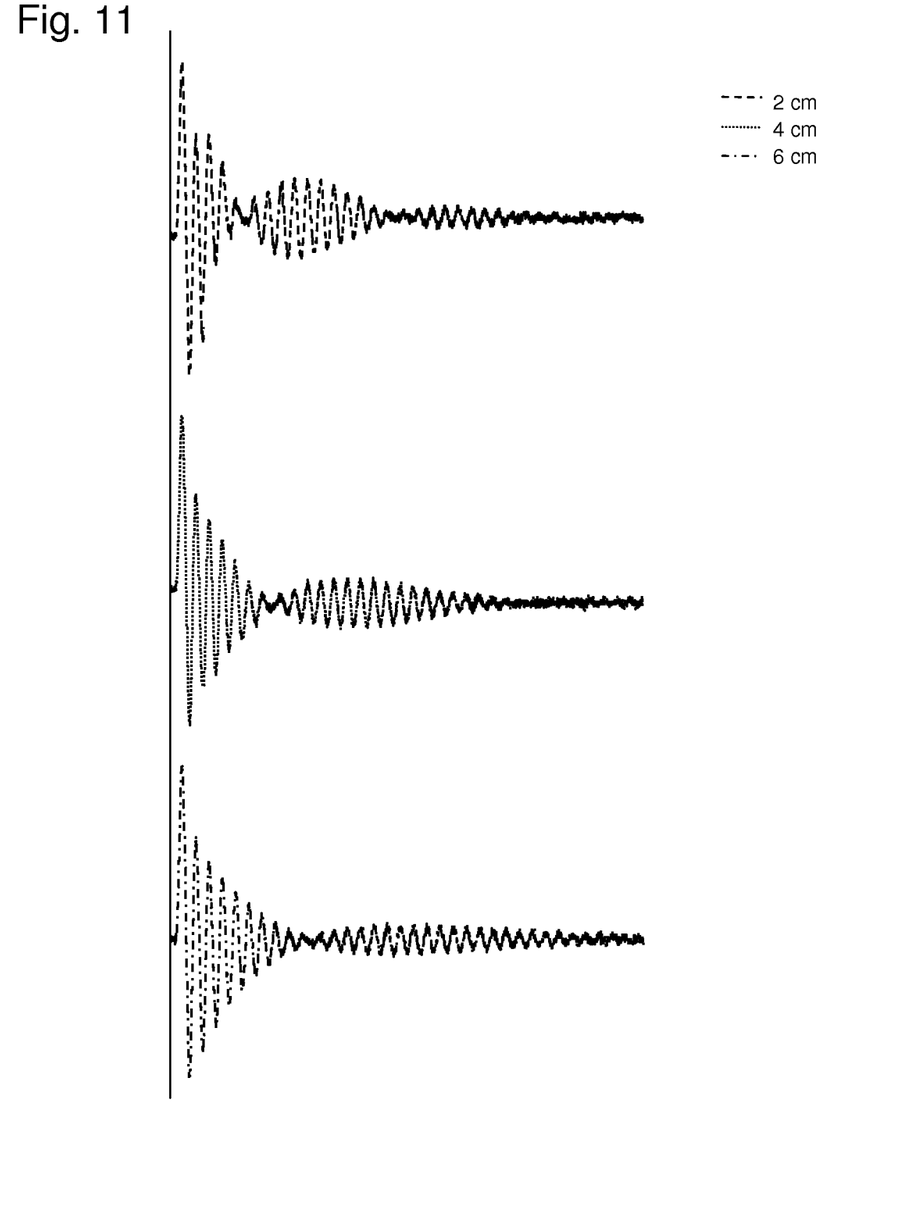
FIG. 11 illustrates various responses of the antenna of the reader as a function of the distance from the receiver.

According to an improvement of the invention, the reader can advantageously determine the distance separating it from a receiver placed in the field of its antenna. FIG. 11 illustrates for this purpose various responses of the antenna of the reader as a function of the distance separating it from a receiver. It can be observed that the response of the antenna is strongly influenced by this distance.

In order to determine the distance between the antenna of the reader and the receiver, various prior initial calibrations of the reader 3 can be carried out. The response of the antenna of the reader is sampled for various distances. These responses are memorized in the reader as reference responses for the various distances.

During a detection phase, the measured response may be compared with the various reference responses in order to deduce the distance between the antenna of the reader and the receiver. The distance can be determined as being that whose reference response is the closest to the measured response, or by distance interpolation between the two distances whose reference responses are closest to the response measured.

According to another improvement of the invention, the reader identifies the type of card present in the field of its antenna. Such an identification of the type of receiver can be carried out in order to reinforce the authentication of the receiver by the reader, and thus to avoid fraud. The authentication is thus reinforced by using the physical layer of the system.

Such an authentication could notably be used for the detection of a relay attack of the amplify and forward type. Attacks of the relay type aim to activate a receiver by discretely placing a fraudulent relay near to this receiver. The relay is then used to carry out a fraudulent transaction with a remote reader. For an attack of the decode and forward type, reference will be made to the authentication of the receiver.

In order to enable such an identification of the receiver, various prior calibrations of the reader 3 may be carried out. The reader 3 can thus be calibrated with various types of receivers. For each of these types of receivers, the response of the antenna of the reader is sampled. The various responses are memorized in the reader as reference responses for the various types of receivers. Several responses could be stored for the same receiver in order to take into account several possible distances.

According to one improvement, the reader can retrace the path of the receiver, by analyzing the successive responses that it induces onto the antenna of the reader. These responses could be compared with reference responses of a receiver at these various distances. Thus, the authenticity of the receiver could be determined in a more precise manner. The detection of a fraudulent relay is notably facilitated.

During a detection phase, the measured response may be compared with the various reference responses in order to deduce the type of receivers present in the field of the antenna of the reader.

When an excitation is applied to the terminals of the antenna of the reader, a current flows through the antenna of the receiver. With a view to enhancing the authentication performance, it may be envisaged for the receiver to measure the response of its antenna to the excitation of the antenna of the reader. The receiver can then transmit the measured response to the reader. The reader can then reinforce the authentication of the receiver in the following manner. After having measured its own response, the reader can determine an expected response for the receiver from a database of correspondences. The reader can then compare the expected response with the measured response transmitted by the receiver. In the case of a large disparity between the expected response and the measured response transmitted by the receiver, the reader will be able to detect an attempt at fraud.

The invention claimed is:

1. A method for detecting a contactless receiver in a field of an antenna of a contactless reader, said method comprising during a first ramp interval, exciting said antenna by applying a potential difference comprising a ramp between first and second values of said potential difference, and during a first plateau interval following said first ramp interval, maintaining said potential difference at said second value of said potential difference, while maintaining said potential difference at said plateau, measuring a response of said antenna, comparing said measured response and a reference response, and determining presence of a contactless receiver in said field of said antenna based at least in part on a result of said comparison.

2. The method of claim 1, wherein said antenna is modeled as a resonator having a resistance, a capacitance, and an inductance in series, said resonator having a natural period, and wherein said first ramp interval is less than one third of said natural period.

3. The method of claim 2, wherein said first plateau interval has a duration greater than eight natural periods.

4. The method of claim 2, wherein said first plateau interval has a duration that is at least half of a duration during which said response of said antenna is measured.

5. The method of claim 2, wherein said first plateau interval has a duration greater than fifty natural periods.

6. The method of claim 2, wherein said resonator has a natural period corresponding to a resonant frequency in a range between 10 and 20 MHz.

7. The method of claim 1, further comprising interrupting said measurement of said response of said antenna, during a second ramp interval that follows said first plateau interval, exciting said antenna by applying a second potential difference, said second potential difference comprising a ramp extending between said second and first values of said potential difference, during a second plateau interval that follows said second ramp interval, maintaining said potential difference at said first value of said potential difference, measuring a response of said antenna during said second plateau interval, comparing a measured response and a reference response, thereby generating a latter comparison, determining presence of a contactless receiver in a field of said contactless reader based at least in part on said latter comparison.

8. The method of claim 7, wherein interrupting said measurement of said response occurs during said first plateau interval.

9. The method of claim 1, further comprising causing said antenna and an antenna of said contactless receiver to be inductively coupled.

10. The method of claim 1, further comprising comparing said measured response with reference responses, each of which corresponds to a distance between said antenna of said contactless reader and a contactless receiver, and based at least in part on said comparison between said measured response and said reference responses, estimating a distance between said antenna of said contactless reader and said contactless receiver.

11. The method of claim 1, further comprising comparing said measured response with reference responses, each of which corresponds to a type of contactless receiver, and at least in part on the basis of said comparison, identifying the type of contactless receiver present in said field of said antenna of said contactless reader.

12. The method of claim 11, wherein identifying a type of contactless receiver comprises identifying a relay, wherein said method further comprises blocking a transaction between said contactless reader and said identified relay.

13. The method of claim 1, wherein comparing said measured response and a reference response comprises calculating a correlation between the reference response and the measured response.

14. The method of claim 1, wherein comparing said measured response and a reference response comprises comparing an amplitude of the measured response with an amplitude of the reference response.

15. The method of claim 1, wherein comparing said measured response and a reference response comprises comparing an envelope of the measured response with the envelope of the reference response.

16. The method of claim 1, wherein comparing said measured response and a reference response comprises comparing a measured spectral response with the reference spectral response.

17. The method of claim 1, wherein comparing said measured response and a reference response comprises comparing statistical elements of the measured response with statistical elements of the reference response.

18. An apparatus for contactless reading, said apparatus comprising an antenna, and a circuit configured for, during a phase of communication with a contactless receiver, selectively exciting said antenna with a frequency substantially equal to a resonant frequency thereof by, during a first ramp interval, applying a potential difference comprising a ramp between first and second values of said potential difference, and during a first plateau interval following said first ramp interval, maintaining said potential difference at said second value of said potential difference, while maintaining said potential difference during said first plateau interval, measuring a response of said antenna, comparing said measured response and a reference response, and determining presence of a contactless receiver in said field of said antenna based at least in part on a result of said comparison.

19. The apparatus of claim 18, wherein said antenna is modeled as a resonator with a resistance, a capacitance and an inductance in series, said resonator having a natural period, wherein said circuit is configured for causing said ramp interval to have a duration that is less than one-tenth of said natural period.

20. The apparatus of claim 19, wherein said circuit is configured for causing said plateau interval to have a duration greater than eight times said natural period.

21. The apparatus of claim 18, wherein said antenna comprises an inductive coupling antenna.

* * * * *